United States Patent
Shimizu et al.

[11] Patent Number: 5,804,332
[45] Date of Patent: Sep. 8, 1998

[54] BATTERY ACCOMMODATING CHAMBER STRUCTURE

[75] Inventors: Hitoshi Shimizu; Shinichi Kakiuchi, both of Tokyo, Japan

[73] Assignee: Asahi Kogaku Kogyo Kabushiki Kaisha, Tokyo, Japan

[21] Appl. No.: 786,651

[22] Filed: Jan. 21, 1997

[30] Foreign Application Priority Data

Jan. 19, 1996 [JP] Japan ..................... 8-007664
Mar. 13, 1996 [JP] Japan ..................... 8-056200

[51] Int. Cl.⁶ ..................................... H01M 2/10
[52] U.S. Cl. ................... 429/100; 429/98; 429/99
[58] Field of Search ................. 429/96, 97, 98, 429/99, 100

[56] References Cited

U.S. PATENT DOCUMENTS

4,230,777 10/1980 Gatto ........................... 429/97
4,391,883 7/1983 Williamson et al. ............ 429/97
4,885,219 12/1989 Miller .......................... 429/99

*Primary Examiner*—Kathryn L. Gorgos
*Assistant Examiner*—Carol Chaney
*Attorney, Agent, or Firm*—Sughrue, Mion, Zinn, Macpeak & Seas, PLLC

[57] ABSTRACT

A battery accommodating chamber structure includes: a battery chamber substantially in the form of a half cylinder and having a battery inserting opening through which a cylindrical battery is loaded in or unloaded from the battery chamber by moving it in a direction perpendicular to the axis of the battery chamber; and a battery lid pivotally coupled to the battery chamber through a shaft which is in parallel with the axis of the battery chamber, to open and close the battery inserting opening. In the structure, the shaft is so arranged that, when the battery lid is opened by turning it about the shaft, at least a part of the battery cover is caused to go into the battery chamber. The battery accommodating chamber structure is free from a difficulty that the battery lid is lost or damaged, and the battery can be readily removed from the battery chamber with simple structure.

16 Claims, 12 Drawing Sheets

BATTERY ACCOMMODATING CHAMBER STRUCTURE

REFERENCE TO BASE PATENT APPLICATION

This application is filed under Paris Convention based on Japanese Patent Application Nos. 8-7664 and 8-56200 filed in Japan respectively on Jan. 19, 1996 and Mar. 13, 1996.

BACKGROUND OF THE INVENTION

This invention relates to the structure of a battery accommodating chamber which is applicable to a variety of electronic devices whose power sources are batteries.

A variety of electronic devices such as cameras, portable radio sets, portable telephone sets, and electrical shavers whose power sources are batteries (hereinafter referred to as "battery-operated devices", when applicable) have a battery accommodating chamber structure for accommodating a battery therein.

One example of the battery accommodating chamber structure has a battery chamber formed in the battery-operated device, and a battery lid which is removable from the battery chamber. The battery lid serves as a wall of the battery chamber when it is attached to the battery chamber. Since the battery lid is removable from the battery-operated device, it is easily lost.

Another example of the battery accommodating chamber structure has a battery lid having one end portion pivotally coupled to a stationary portion near the battery chamber, and another end portion with an engaging pawl which is lockable to the stationary portion of the battery-operated device. To open the battery lid, the engaging pawl is disengaged from the stationary portion of the battery-operated device, and then the battery lid is swung about the pivotally coupled end portion. In this case, the opened battery lid protrudes from the battery-operated device. The battery accommodating chamber structure of this type overcomes the problem that the battery lid is easily lost, because the battery lid is pivotally coupled to the stationary portion near the battery chamber. However, it is not without a shortcoming. In particular, an external force applied to the protruding battery lid can easily break in the opened position, the part through which the battery lid is pivotally coupled to the battery-operated device.

In a third example of the battery accommodating chamber structure, a small battery inserting opening makes it rather difficult to take the battery out of the battery chamber with the fingers, even when the battery lid has been fully opened, or the battery does not come out of the battery chamber by its own weight when the battery inserting opening is titled downwards. Therefore, the battery-accommodating chamber structure of this typed must be provided with battery removing means such as a piece of ribbon or film having one end fixedly secured to the inside of the battery chamber.

SUMMARY OF THE INVENTION

In view of the foregoing, the objects of the invention are to provide a battery accommodating chamber structure in which the battery lid is not easily lost or damaged, from which the battery can be readily removed and which is simple in structure.

According to a first aspect of the invention, a battery accommodating chamber structure comprises: a battery chamber having a substantially semi-cylindrical shape and a battery inserting opening through which a cylindrical battery is loaded in or unloaded from the battery chamber by moving the battery in a direction perpendicular to an axis of the battery chamber; and a battery lid supported pivotally about an axis extending in parallel with the axis of the battery chamber for opening and closing the battery lid. The axis about which the battery lid is pivotally supported is so positioned that, when the battery lid is opened by turning the battery lid about this axis, at least a part of the battery lid is caused to go into the battery chamber.

According to another aspect of the invention, a battery accommodating chamber structure comprises: a battery chamber for accommodating a cylindrical battery; and a battery lid pivotally coupled to a stationary portion adjacent the battery chamber, such that at least a part of the battery lid is positioned between a battery loaded in the battery chamber inner wall of the battery chamber when the battery lid is opened.

DETAILED DESCRIPTION OF PREFERRED EMBODIMENTS

Preferred embodiments of the invention will be described with reference to the accompanying drawings.

First Embodiment

FIGS. 1 through 4 show an example of a battery accommodating chamber structure applied to a digital still camera 10 for recording image data on an IC card, according to a first embodiment of the invention. The camera 10 has a thin, box-shaped casing 11, on the upper surface of which are provided a liquid crystal section 12 for displaying a variety of photographing data, a release button 13, a plurality of operating buttons 14 which are selectively operated for a variety of photographing functions such as a photographing mode selecting function, and a macro mode switching slide switch 15.

The rear surface of the casing 11 is provided with a finder eye-piece window 16, an IC card insertion opening 17, an IC card eject button 18 and the like, and the front surface thereof is provided with an objective lens window 19, a finder objective window 20 and the like.

The casing 11 includes a grip section 21 curved from a part of the upper surface to a part of the side surface. The camera 10 is equipped with a battery accommodating chamber structure in the grip section 21.

Figure 1:
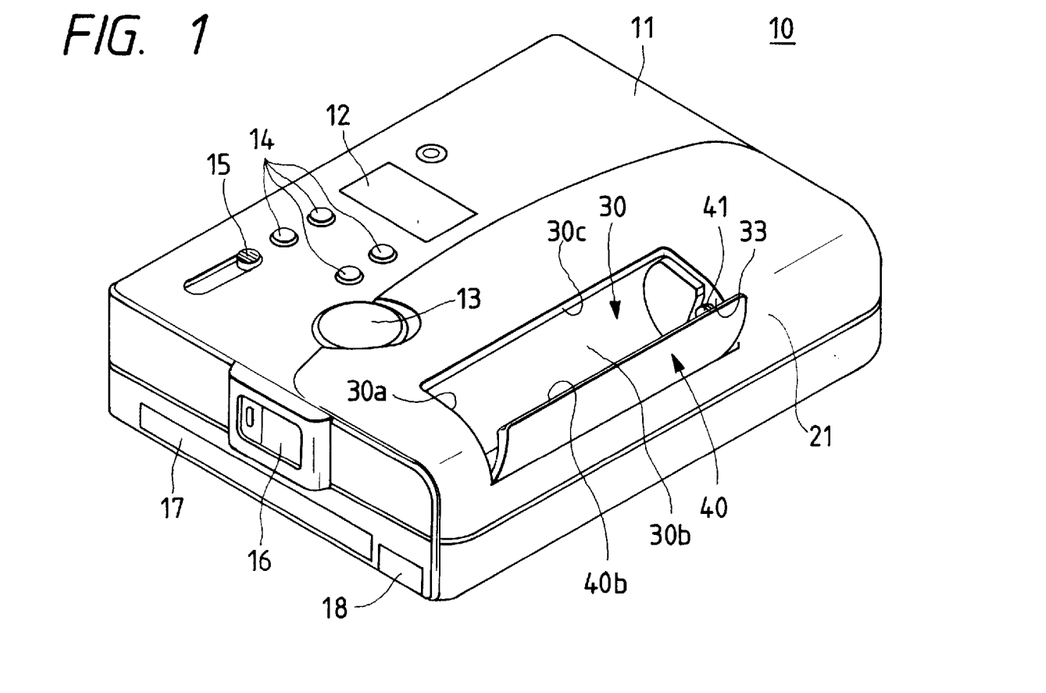
FIG. 1 is a perspective view of a first embodiment of a battery accommodating chamber structure according to the present invention, as applied to a digital still camera.
Figure 2:
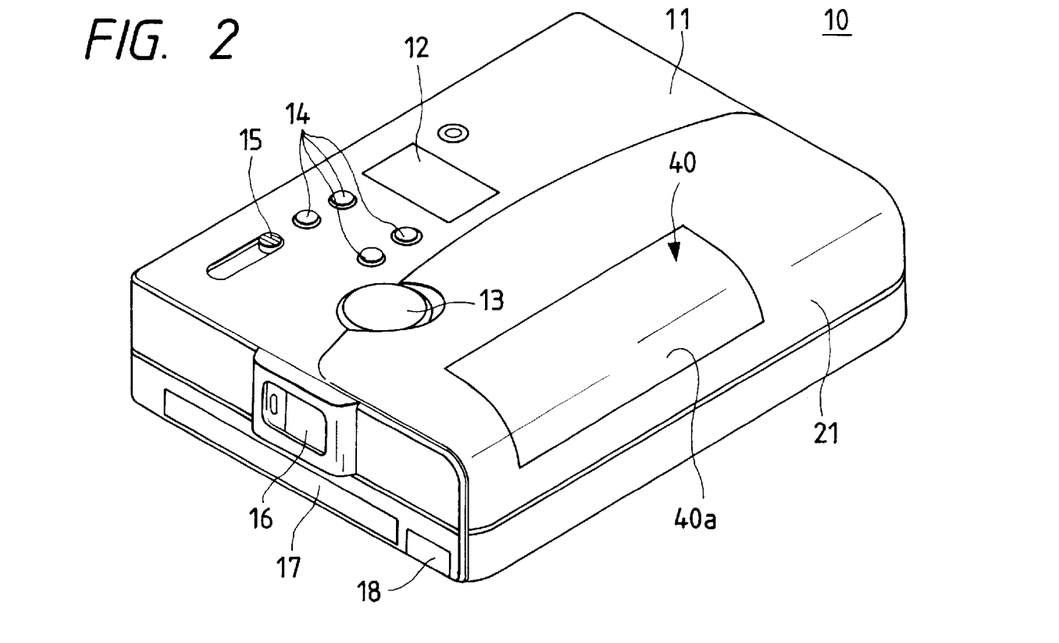
FIG. 2 is a perspective view of the digital still camera with its battery chamber closed.
Figure 3:
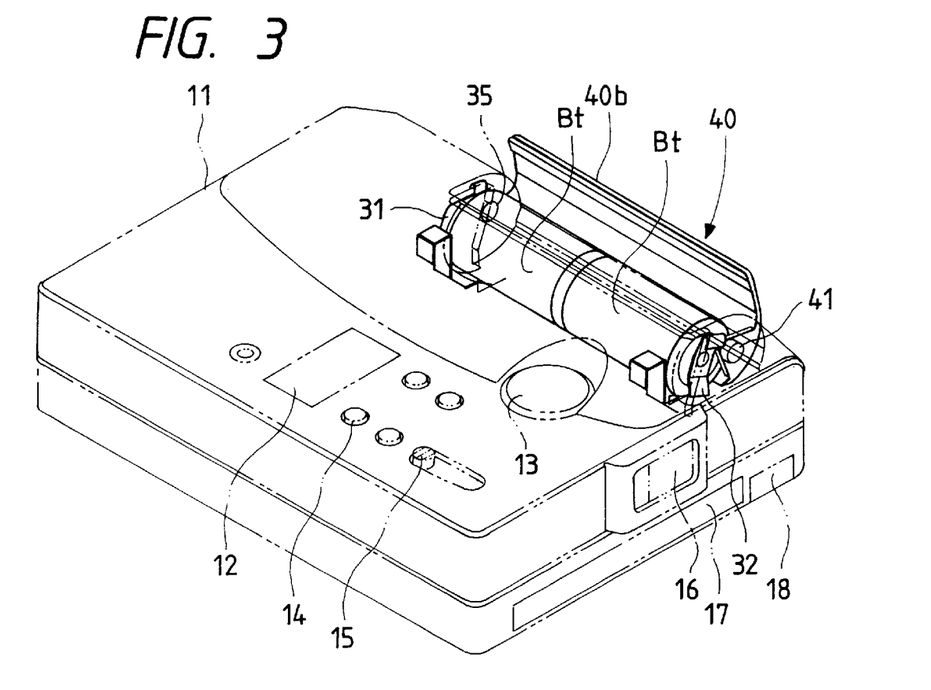
FIG. 3 is a perspective view of the digital still camera of FIG. 1 as viewed at a difference angle.
Figure 4:
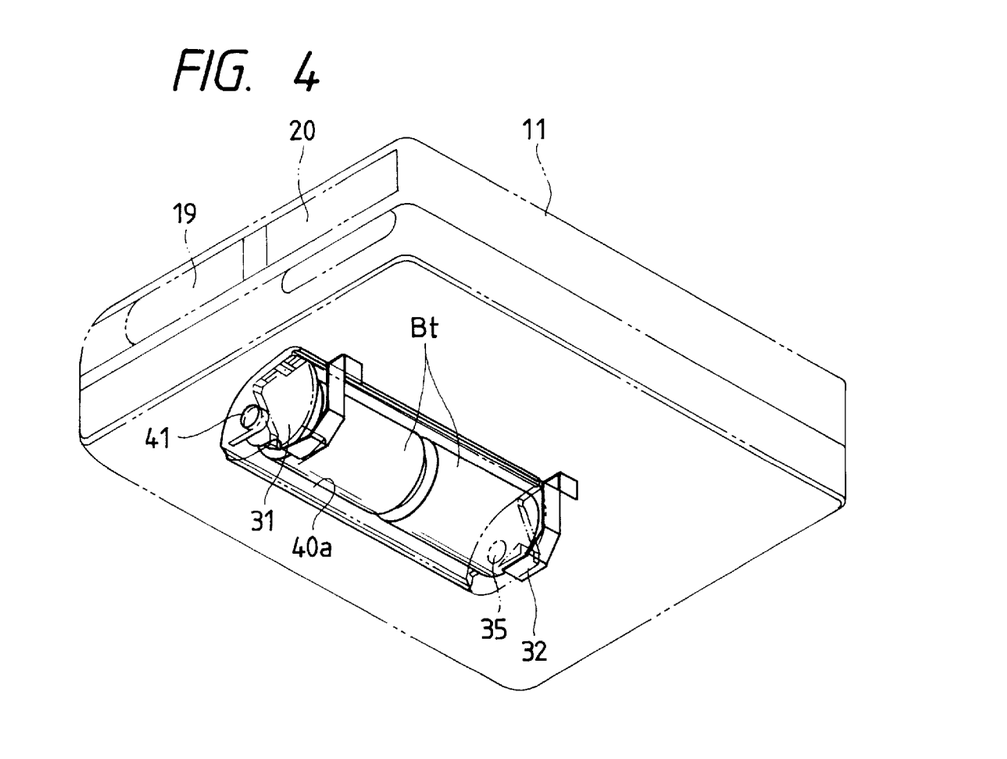
FIG. 4. is a perspective view of the digital still camera of FIG. 2 as viewed at a different angle.
Figure 5:
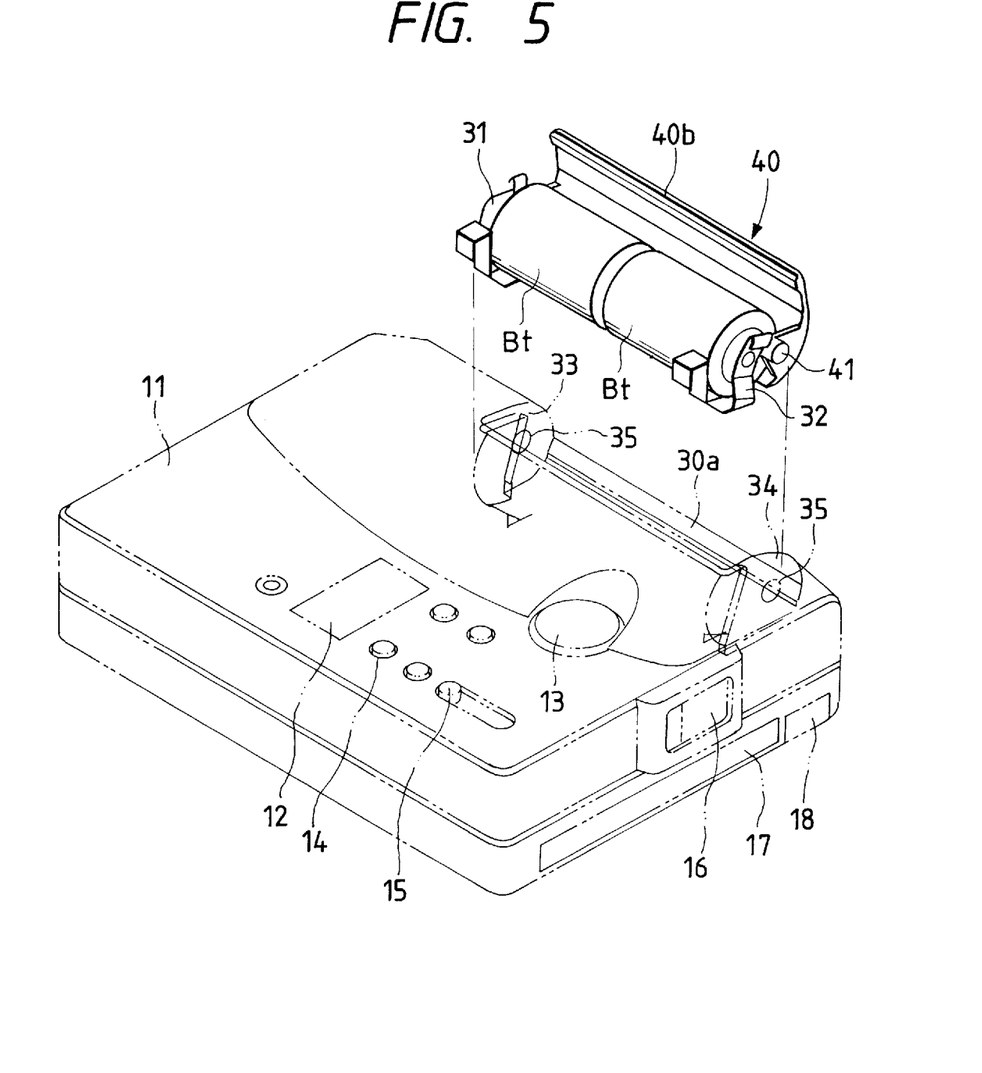
FIG. 5 is an exploded perspective view of the digital still camera of FIG. 1, including batteries.

The battery accommodating chamber structure comprises: a battery chamber 30 having a substantially semi-cylindrical shape that extends in a front-to-rear direction of the camera 10; and a battery lid 40 being substantially arcuate in cross-section and which opens and closes the battery chamber 30. The camera 10 uses two batteries Bt as a portable power source, each of which is, for instance, "a CR2 battery" which is a kind of lithium battery.

The battery chamber 30 is shaped to accommodate two batteries Bt in series. Each battery Bt is loaded into or unloaded from the battery chamber by moving it in a direction perpendicular to a longitudinal axis C of the substantially semi-cylindrical battery chamber 30. When the batteries Bt have been loaded in the battery chamber 30, the longitudinal axis C of the battery chamber 30 substantially coincides with a central axis of the batteries (which extends through the centers of the two batteries Bt in the front-to-rear direction of the camera 10). A negative-terminal-side contact piece 32 is secured to the front end of the battery chamber 30, and a positive-terminal-side contact piece 31 is secured to the rear end of the battery chamber 30. The negative-terminal-side contact piece 32 is made of an elastic conductive material, its lower end portion 32a (cf. FIG. 13) is secured to the bottom of the battery chamber 30, and the negative-terminal-side contact piece 32 is somewhat inclined towards the battery chamber 30 when no batteries Bt are loaded in the battery chamber 30. Hence, when two batteries Bt have been loaded in the battery chamber 30, the elastic force of the negative-terminal-side contact piece 32 acts along the central axis of the batteries Bt, pressing the two batteries Bt against the positive-terminal-side contact piece 31. Thus, the two batteries are Bt fixedly held in the battery chamber 30.

Figure 6:
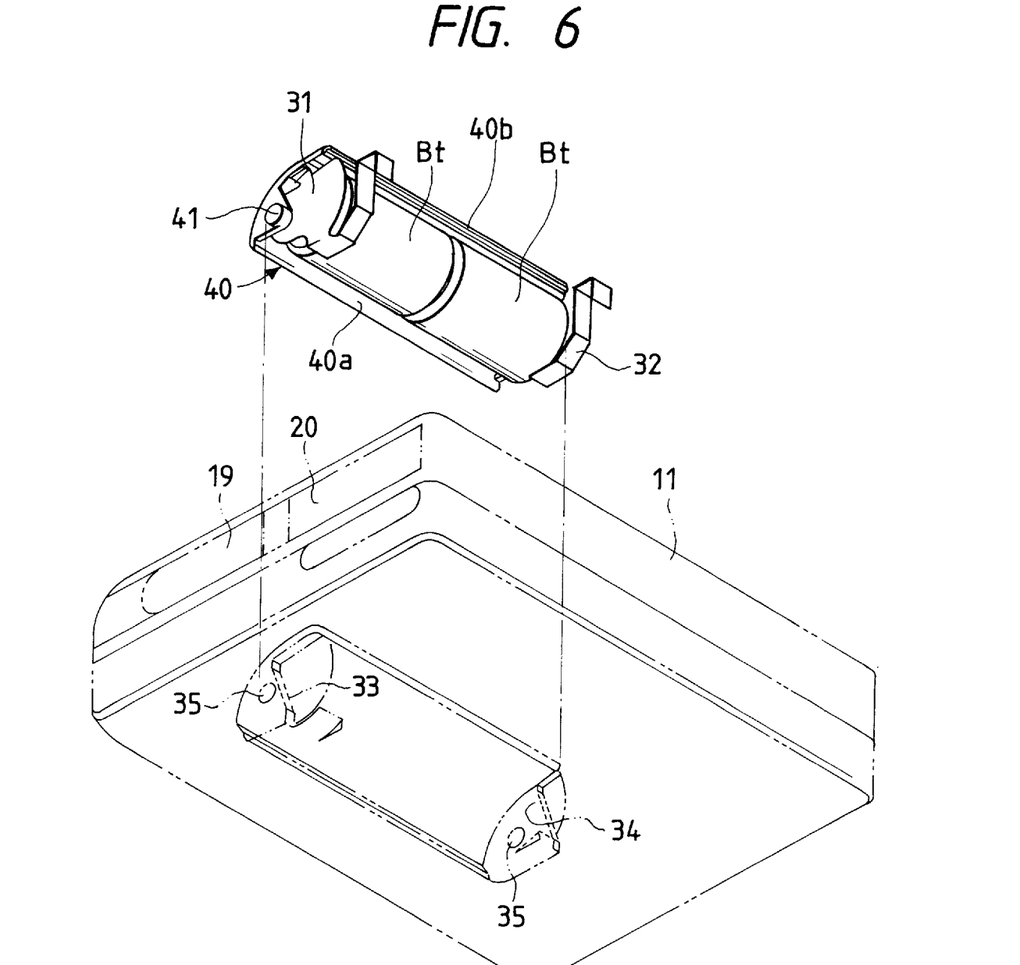
FIG. 6 is an exploded perspective view of the battery lid of the digital still camera of FIG. 5, including the batteries, as viewed at a different angle.

The battery lid 40 is substantially arcuate in cross-section, such that when the battery lid 40 is closed, it conforms to a longitudinal side wall of the loaded batteries Bt. Also, when closed, the battery lid 40 forms a smooth, integral outer surface in cooperation with the grip section 21. The battery lid 40 has a shaft portion 41 at both ends as viewed in the front-to-rear direction of the camera 10. More specifically, the shaft portions 41 and 41 define an axis which is parallel to the longitudinal axis C of the battery chamber 30.

Two opposite walls 33 and 34 of the battery chamber 30, confront the shaft portions 41 and 41 of the battery lid 40, respectively. The walls 33 and 34 of the battery chamber 30 which are provided in the front-to-rear direction of the camera 10 have bearing holes 35 which rotatably support the respective shaft portions 41 and 41 of the battery lid 40. The bearing holes 35 are formed in the direction of the longitudinal axis C, and spaced therefrom a distance which is less than a radius of the batteries Bt. The shaft portions 41 and 41 are rotatably fitted in the bearing holes 35 and 35, respectively. When the battery lid 41 is turned about the shaft portions 41; that is, it is opened, its side portion 40a, close to the shaft portions 41, enters into the battery chamber 30 along the inner wall 30b of the battery chamber 30.

The battery chamber 30 has locking means (not shown) at a predetermined position, which, when the battery lid 40 is closed, is engaged with a predetermined portion of the battery lid 40 to hold the battery lid 40 closed. The locking means may be a conventional one such as a locking pawl, and a click stop mechanism.

The battery lid 40 has engaging steps 40b and 40c provided along respective edges located at circumferential ends of the arcuate battery lid 40. On the other hand, the battery chamber 30 has mating locking steps 30c and 30d provided along both edges of the battery inserting opening which are parallel to the axis C of the battery chamber 30. Hence, when the battery lid 40 is closed, the engaging step 40b is engaged with the locking step 30c, while the engaging step 40c is engaged with the locking step 30d, so that the outer surface of the battery lid 40 is integrated with the surface of the grip section 21.

Figure 7:
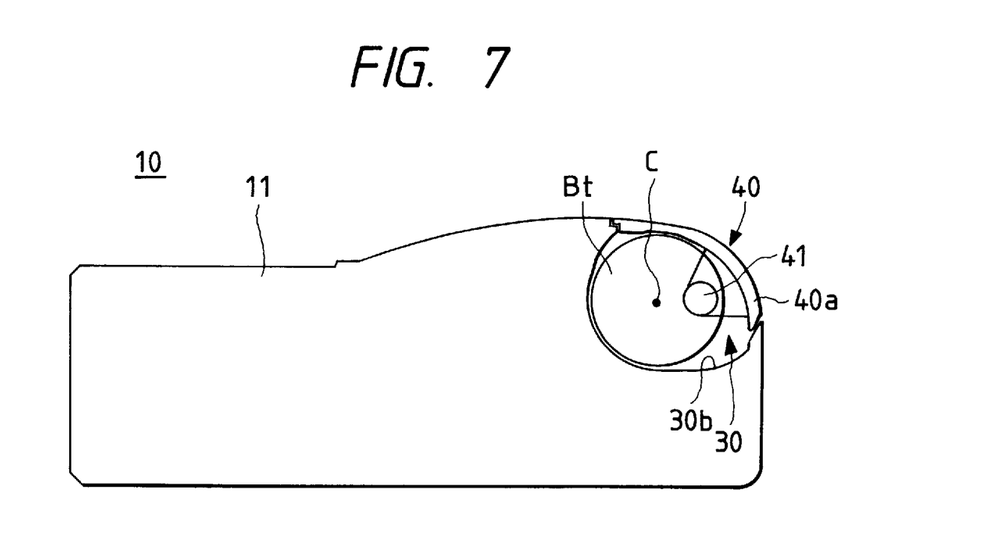
FIG. 7 is a diagram showing the battery accommodating chamber structure, with batteries accommodated in the battery chamber and the battery lid closed.
Figure 8:
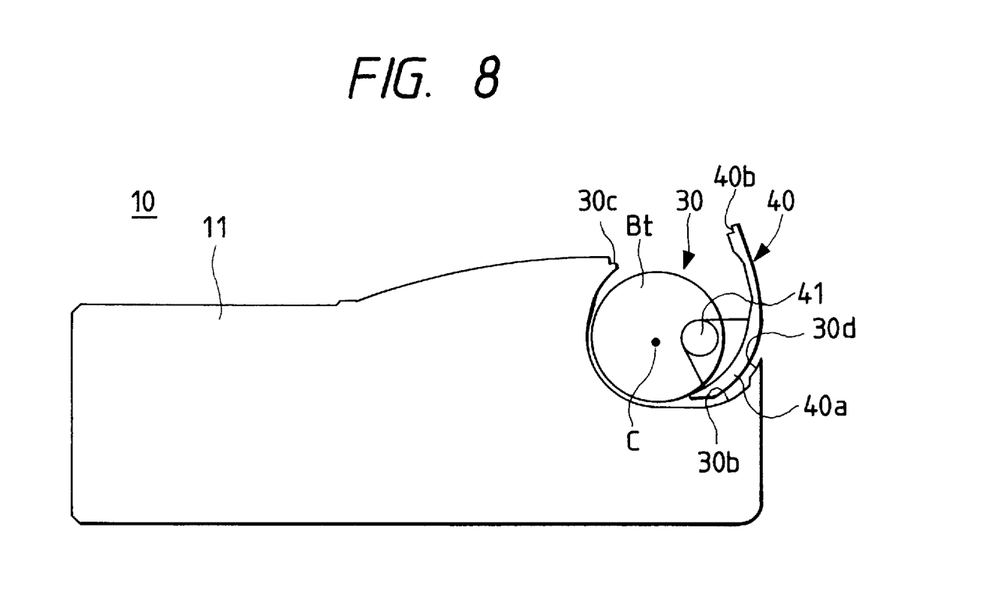
FIG. 8 is a diagram showing the battery accommodating chamber structure with the battery lid half opened.
Figure 9:
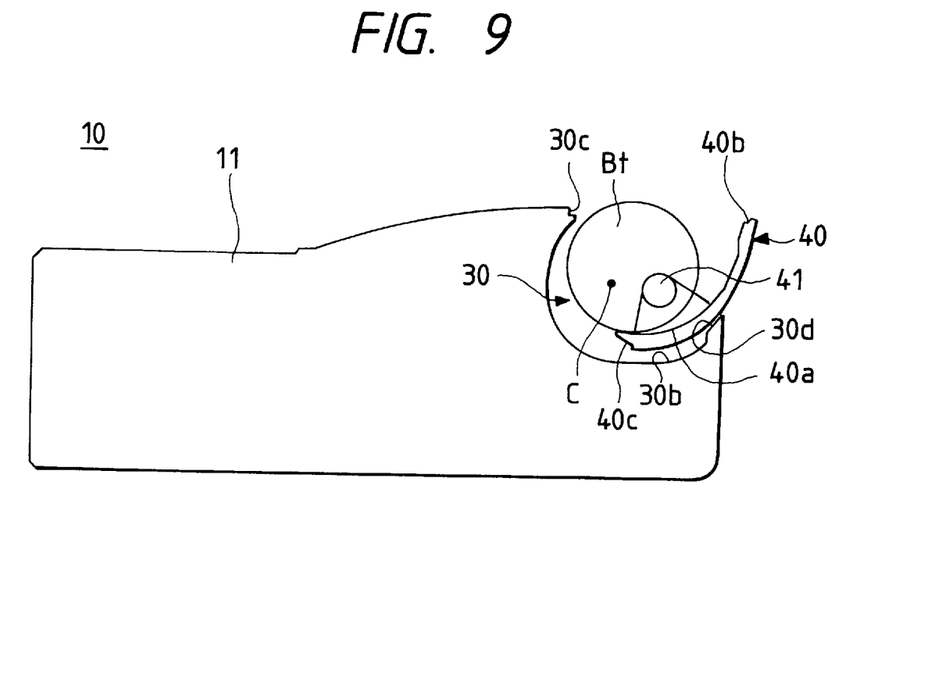
FIG. 9 is a diagram showing the battery accommodating chamber structure with the battery lid opened fully.

The battery accommodating chamber structure of the camera 10 thus constructed is operated as follows. FIG. 7 shows the battery accommodating chamber structure with two batteries Bt set in the battery chamber 30, the battery lid 40 is closed. When the battery lid 40 is turned about the shaft portion 41, first the side portion 40a of the battery lid 40 enters into the battery chamber 30 (FIG. 8), and then interposes between the batteries Bt and the inner wall 30b of the battery chamber 30, thus slightly raising the batteries Bt from the battery chamber (FIG. 9). That is, the side portion 40a functions as a discharge section which, when the battery lid 40 is opened, moves the batteries Bt from a predetermined battery accommodating position in the battery chamber 30 so that they are ejected (or unloaded) therefrom. FIG. 9 shows a state of the battery accommodating chamber structure that the batteries Bt can be loaded into unloaded from the battery chamber 30.

When the battery lid 40 is closed, the batteries Bt are moved from a slightly raised position (FIG. 9) to the predetermined battery accommodating position in the battery chamber 30 (FIG. 8), and then the engaging steps 40b and 40c are engaged with the locking steps 30c and 30d, respectively. Thus, the battery lid 40 is completely closed (FIG. 7).

As is apparent from the above description, in the battery accommodating chamber structure of the invention, the battery lid 40 is pivotally coupled to the casing 11, and therefore the battery lid 40 will never be lost. Furthermore, when the battery lid 40 is opened, the side portion of the battery lid enters into the battery chamber 30. Hence, unlike the battery accommodating chamber structure in which the battery lid 40 is entirely protruded from the casing, the present battery accommodating chamber structure prevents an external force applied to the battery lid 40 from damaging the parts (the shaft portions 41 of the bearing holes 35) which are provided for pivotally coupling the battery lid 40 to the casing 11. When the battery lid 40 is opened, the batteries Bt are slightly raised from the battery chamber 30, and therefore the batteries Bt can be unloaded from (taken out of) the battery chamber 30 with ease. Hence, the present battery accommodating chamber structure does not need an additional battery unloading means such as a piece of ribbon or film whose one end is fastened to the inside of the battery chamber.

Second Embodiment

Figure 10:
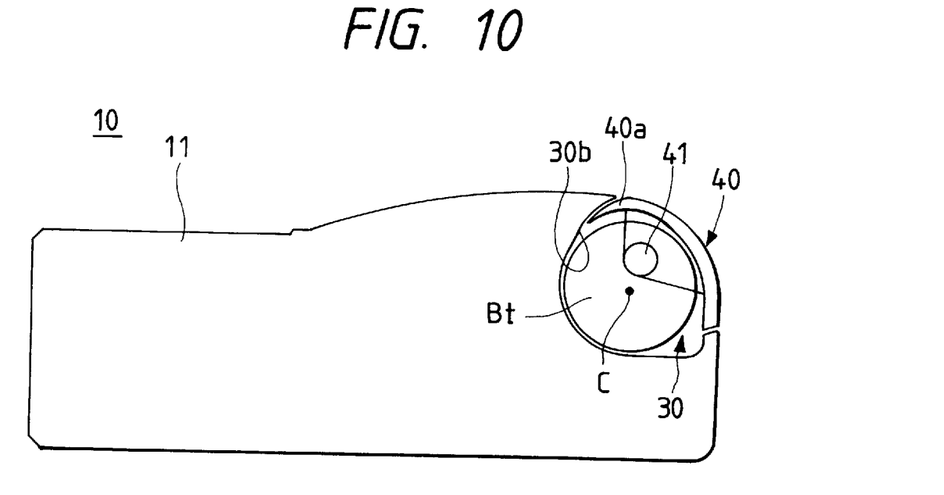
FIG. 10 is a diagram showing the battery accommodating chamber structure according to a second embodiment of the invention, with batteries loaded in the battery chamber and the battery lid closed.
Figure 11:
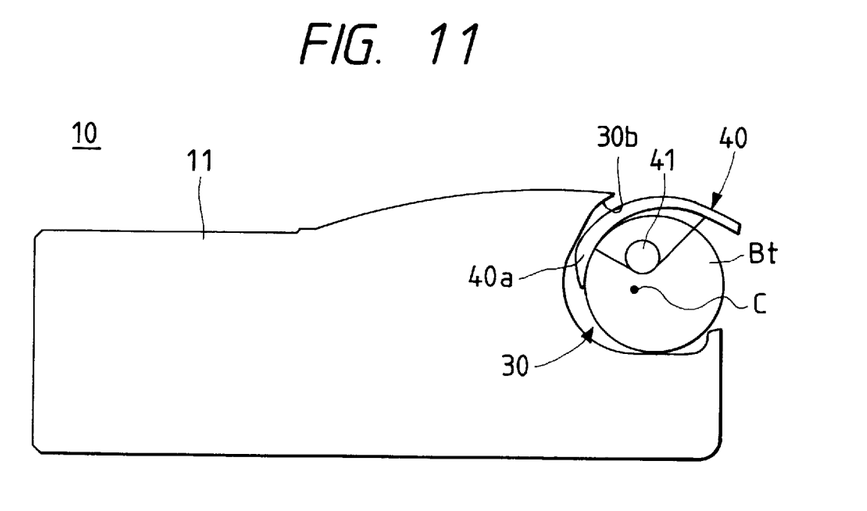
FIG. 11 is a diagram showing the battery accommodating chamber structure according to the second embodiment with the battery lid half opened.
Figure 12:
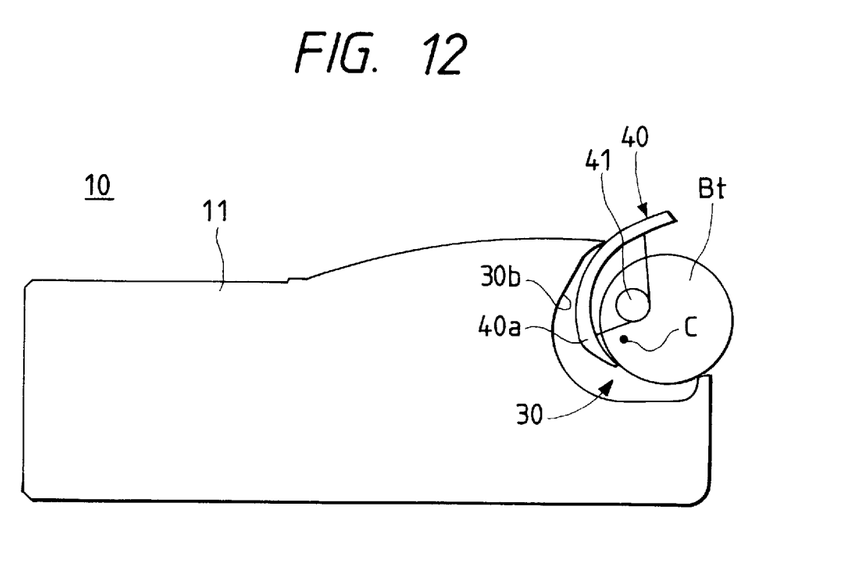
FIG. 12 is a diagram showing the battery accommodating chamber structure according to the second embodiment with the battery lid opened fully.

FIGS. 10 through 12 illustrate the battery accommodating chamber structure applied to a camera 10, according to a second embodiment of the invention. Parts corresponding functionally to those already described with reference to the first embodiment are therefore designated by the same reference numerals or characters. The battery accommodating chamber structure of the second embodiment is different from the battery accommodating chamber structure of the first embodiment in that, the opening direction of the battery lid 40 is opposite to the opening direction of the first embodiment. The remaining portions of the second embodiment are substantially equivalent to those of the first embodiment. The battery accommodating chamber structure of the second embodiment also provides the same advantages as the battery accommodating chamber structure of the first embodiment.

Third Embodiment

FIGS. 13 through 16 illustrate the battery accommodating chamber structure applied to a camera 10, according to a third embodiment of the invention. Parts corresponding functionally to those already described with reference to the of the first embodiment are therefore designated by the same reference numerals or characters. The battery accommodating chamber structure of the third embodiment is different from the battery accommodating chamber structure of the first embodiment in that a protrusion (ejecting protrusion) 40d is formed on the inner surface of the side portion 40a of the battery lid 40. Other than the protrusion 40d provided on the battery lid 40, the third embodiment is substantially equivalent to the first embodiment. Hereinafter, in FIG. 13, the battery Bt on the left side will be referred to as a battery $Bt_1$, and the battery Bt on the right side will be referred to as a battery $Bt_2$.

Figure 13:
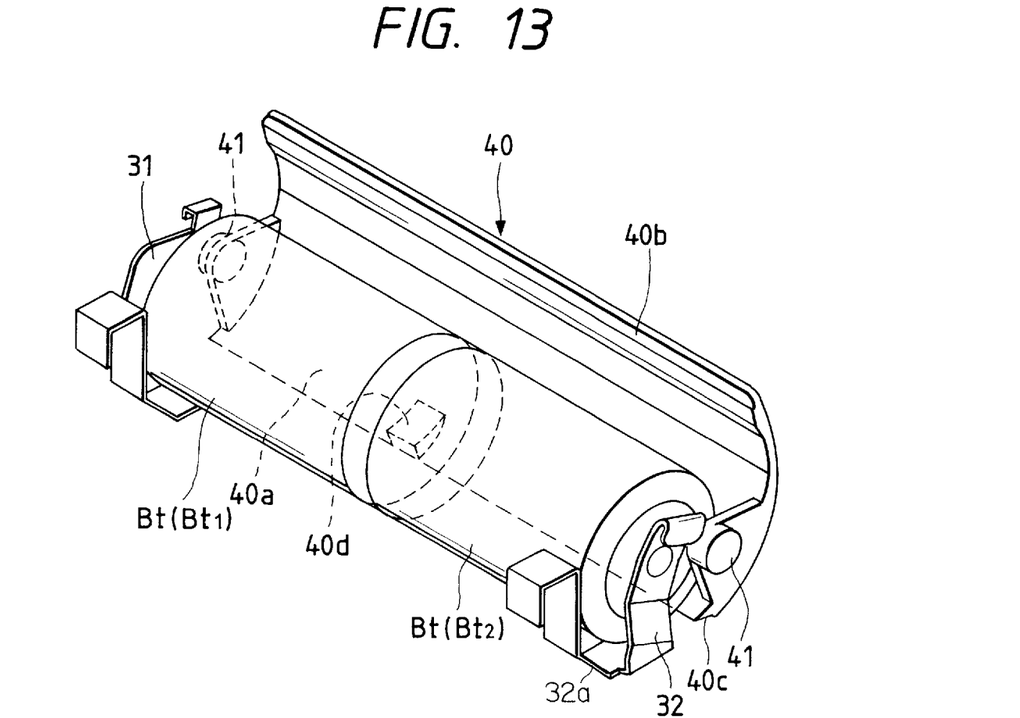
FIG. 13 is an enlarged perspective view of the battery lid of the battery accommodating chamber structure according to a third embodiment of the invention.

The protrusion 40d is so positioned that it confronts the cylindrical surface of the battery $Bt_1$. More specifically, it confronts a portion of the cylindrical surface of the battery $Bt_1$ near the junction of the two batteries $Bt_1$ and $Bt_2$.

Figure 14:
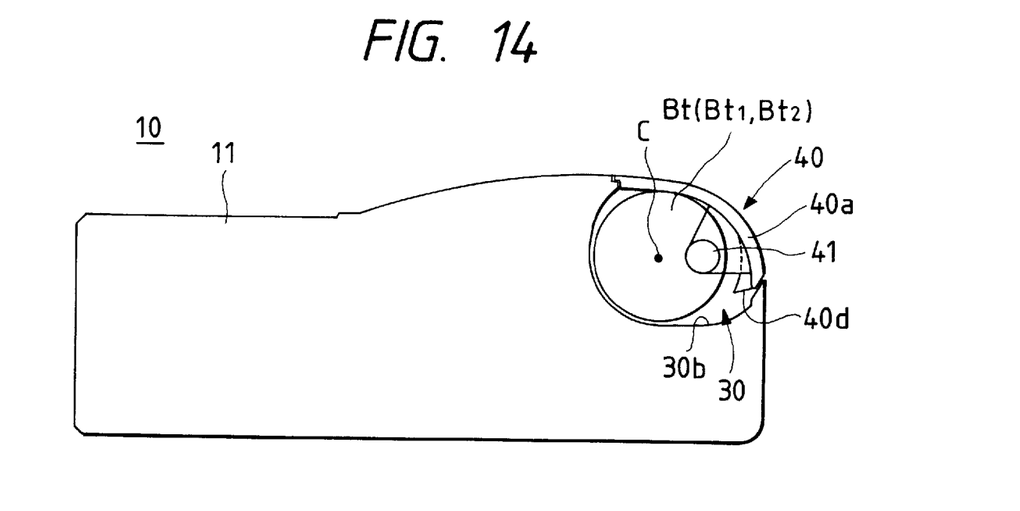
FIG. 14 is a diagram showing the battery accommodating chamber structure according to the third embodiment, with batteries loaded in the battery chamber and the battery lid closed.
Figure 15:
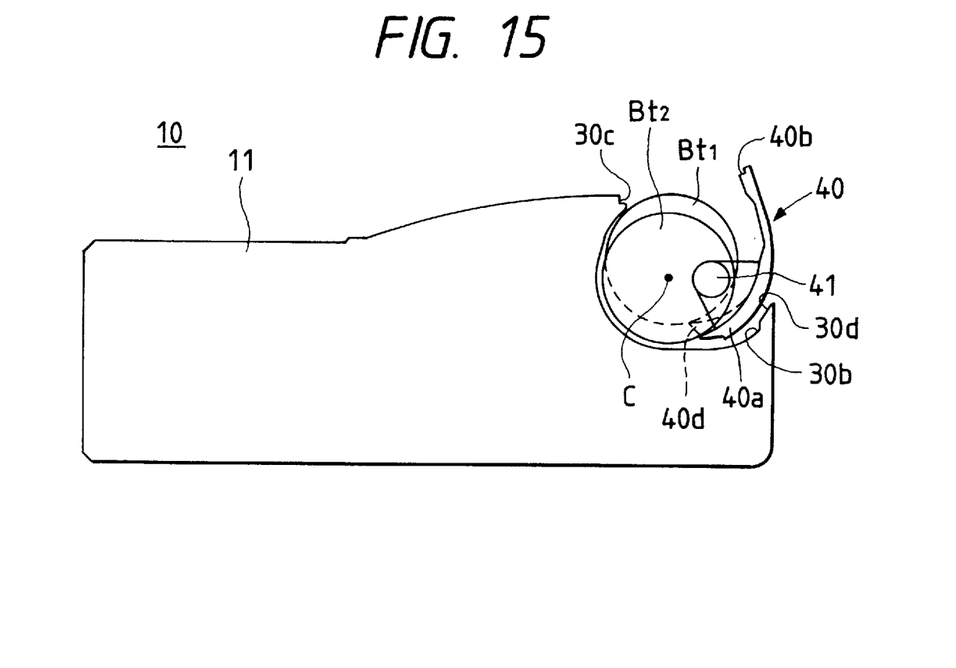
FIG. 15 is a diagram showing the battery accommodating chamber structure according to the third embodiment, with the battery lid half opened.
Figure 16:
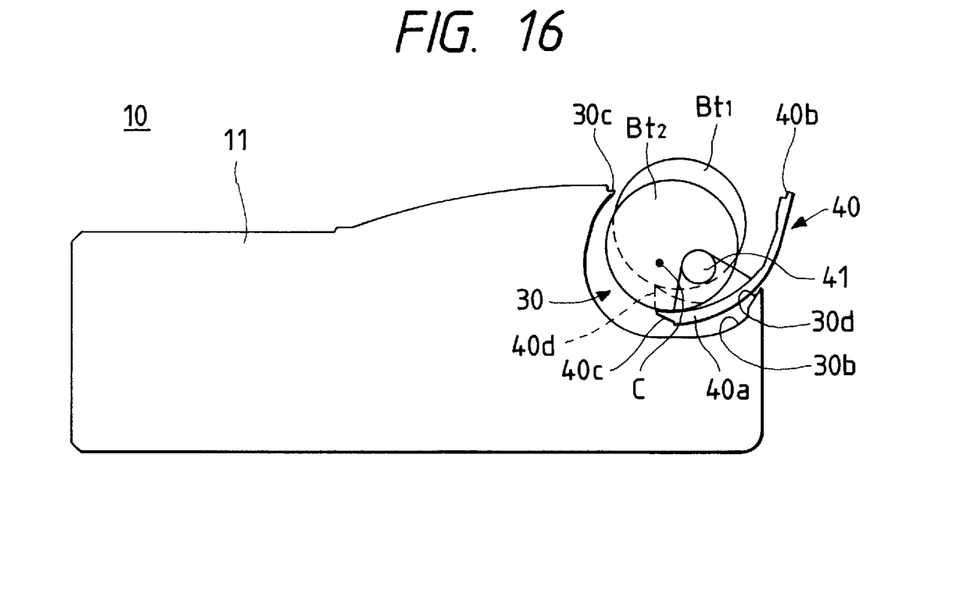
FIG. 16 is a diagram showing the battery accommodating chamber structure according to the third embodiment, with the battery lid opened fully.
Figure 17:
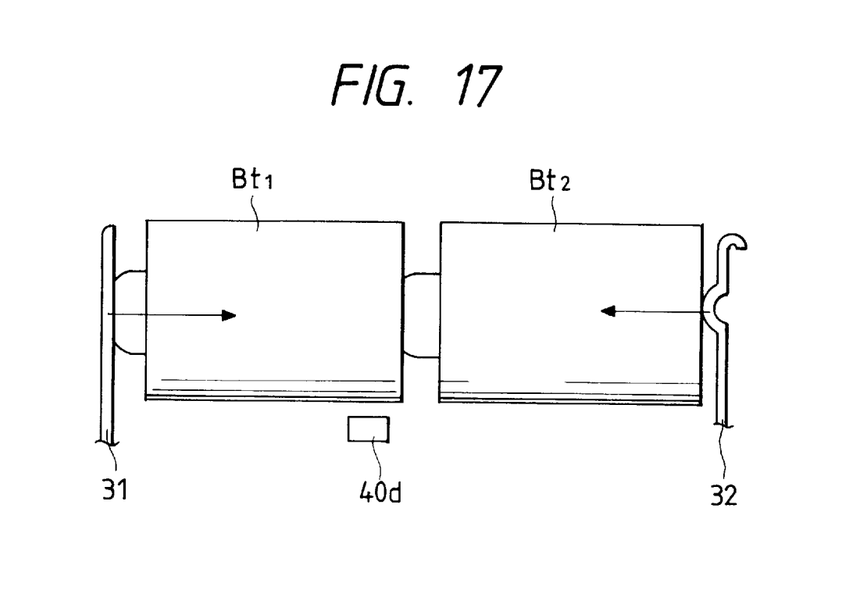
FIG. 17 is a diagram showing batteries which have been loaded in the battery chamber of the battery accommodating chamber structure according to the third embodiment of the invention.
Figure 18:
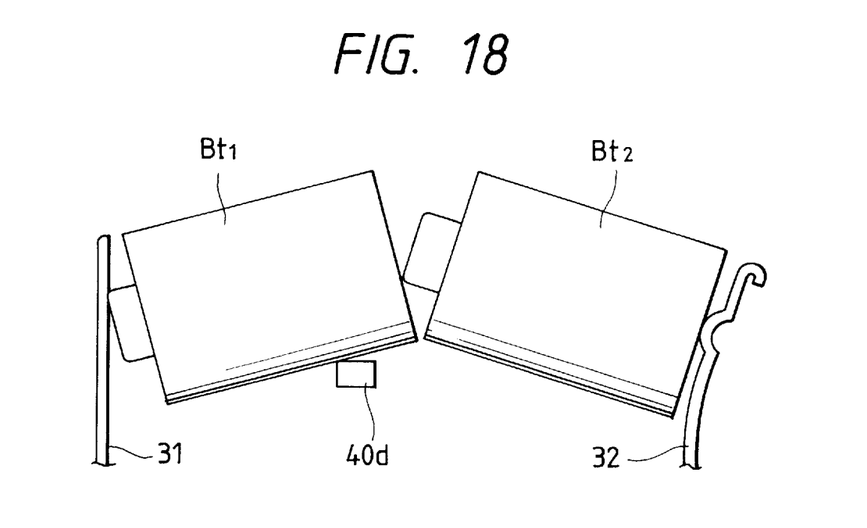
FIG. 18 is a diagram showing the batteries displaced when the battery lid is opened, according to the third embodiment of the invention.

FIG. 14 shows the battery accommodating chamber structure with the two batteries Bt ($Bt_1$ and $Bt_2$) loaded in the battery chamber 30, and the battery cover 40 closed. When the battery lid 40 is turned about the shaft portions 41 to open, first the side portion 40a of the battery lid 40 enters into the battery chamber 30, so that the protrusion 40d abuts against the outer cylindrical surface of the battery $Bt_1$ and raises a first end portion (abutting against the battery $Bt_2$) of the battery $Bt_1$ (FIG. 15). As the battery lid 40 is further turned in the same direction, the protrusion 40d further raises the first end portion of the battery $Bt_1$, while the side portion 40a abuts against a second end portion (abutting against the positive-terminal side contact piece 31) of the battery $Bt_1$, and the battery $Bt_1$, and then somewhat raises the batteries $Bt_1$, and $Bt_2$ from the battery chamber 30 (FIG. 16). Hence, with the battery accommodating chamber structure according to the third embodiment, when the battery lid 40 is opened as shown in FIG. 16, the first end portion of the battery $Bt_1$ is raised higher than the end portion of the battery $Bt_2$ which confronts the first end portion of the battery $Bt_1$. Hence, with the aid of the elastic force of the negative-terminal-side contact piece 32, both of the batteries $Bt_1$, and $Bt_2$ are ejected from the battery chamber 30. This will be described in more detail. When the two batteries $Bt_1$ and $Bt_2$ are loaded in the battery chamber 30 (as shown in FIG. 17), the elastic force of the negative-terminal-side contact piece 32 acts along the central axis of the two batteries $Bt_1$ and $Bt_2$ to urge them against the positive-terminal-side contact piece 31. When the protrusion 40d applies a force to the outer cylindrical surface of the battery $Bt_1$, near the junction of the two batteries $Bt_1$ and $Bt_2$, and in a direction perpendicular to the central axis of the two batteries $Bt_1$ and $Bt_2$ (i.e., in a vertical direction in FIG. 17), the net force acting on the junction of the batteries $Bt_1$ and $Bt_2$ is shifted obliquely with respect to the central axis of the batteries $Bt_1$ and $Bt_2$. As a result, as shown in FIG. 18, the elastic force of the negative-terminal-side contact piece 32 causes the two end portions of the batteries $Bt_1$ and $Bt_2$ which are abutted against each other to be ejected from the battery chamber 30. Hence, with the battery accommodating chamber structure of the camera according to the third embodiment, the batteries Bt ($Bt_1$ and $Bt_2$) can be more readily removed from the battery chamber 30.

Fourth Embodiment

FIGS. 19 through 22 illustrate the battery accommodating chamber structure applied to the camera 10, according to a fourth embodiment of the invention. Parts corresponding functionally to those already described with reference to the above-described first embodiment are therefore designated by the same reference numerals or characters. The fourth embodiment is different from the first embodiment in that a protrusion 30e extends inwardly from the inner wall 30b of the battery chamber 30. Other than the protrusion 30e be provided on the inner wall 30b of the battery chamber 30, the fourth embodiment is substantially equivalent to the first embodiment. Hereinafter, a battery Bt in the right side of the battery chamber 30 in FIG. 19 will be referred to as "a battery $Bt_1$", and a battery Bt in the left side of the battery chamber will be referred to as "a battery $Bt_2$".

Figure 19:
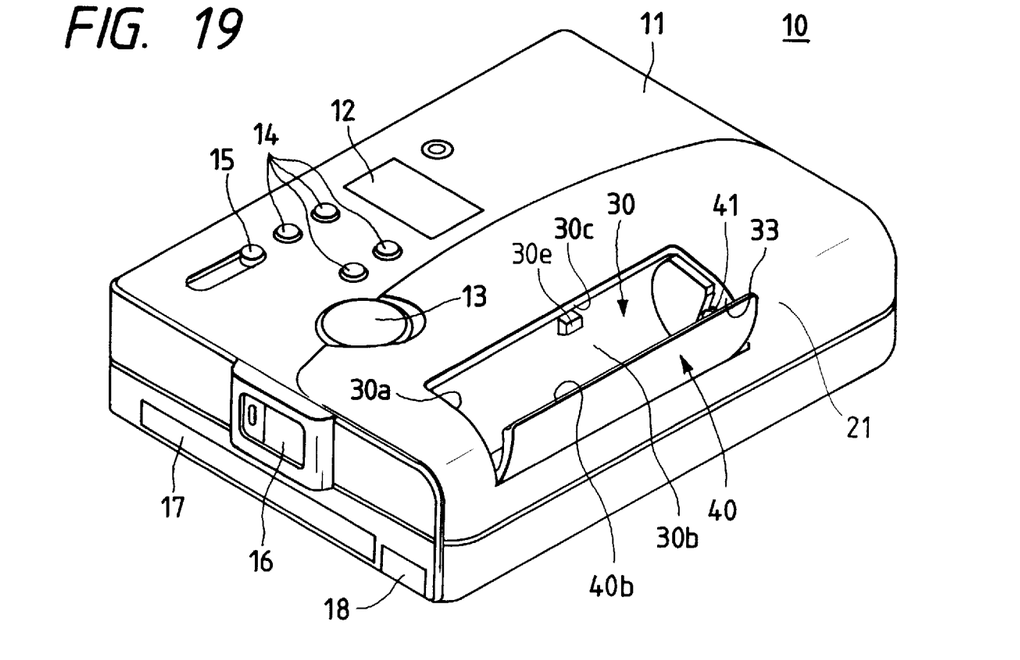
FIG. 19 is a perspective view of the battery accommodating chamber structure in a digital still camera, according to a fourth embodiment of the invention.

The protrusion 30e confronts the outer cylindrical surface of the battery $Bt_1$. More specifically, it confronts a first end portion of the outer cylindrical surface of the battery $Bt_1$ near the junction of the two batteries $Bt_1$ and $Bt_2$.

Figure 20:
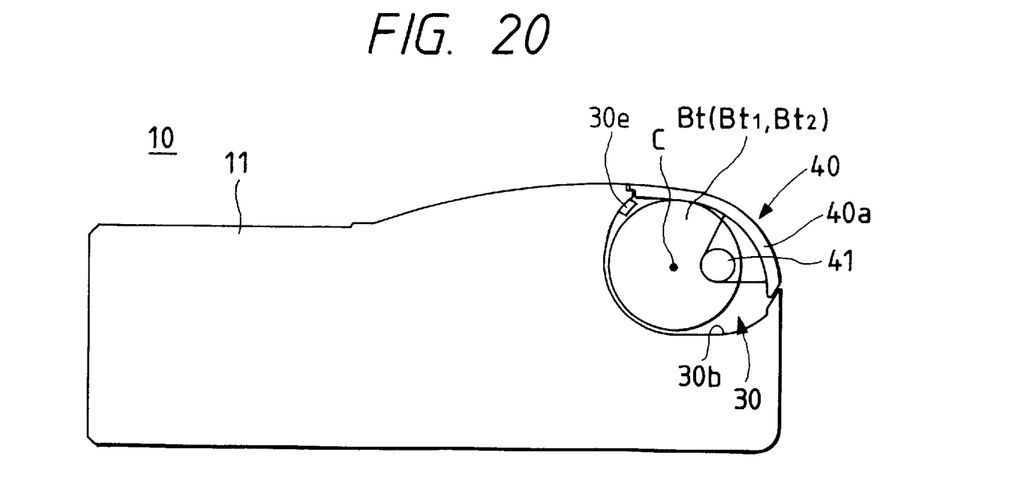
FIG. 20 is a diagram showing the battery accommodating chamber structure according to the fourth embodiment, with batteries loaded in the battery chamber and the battery lid opened.
Figure 21:
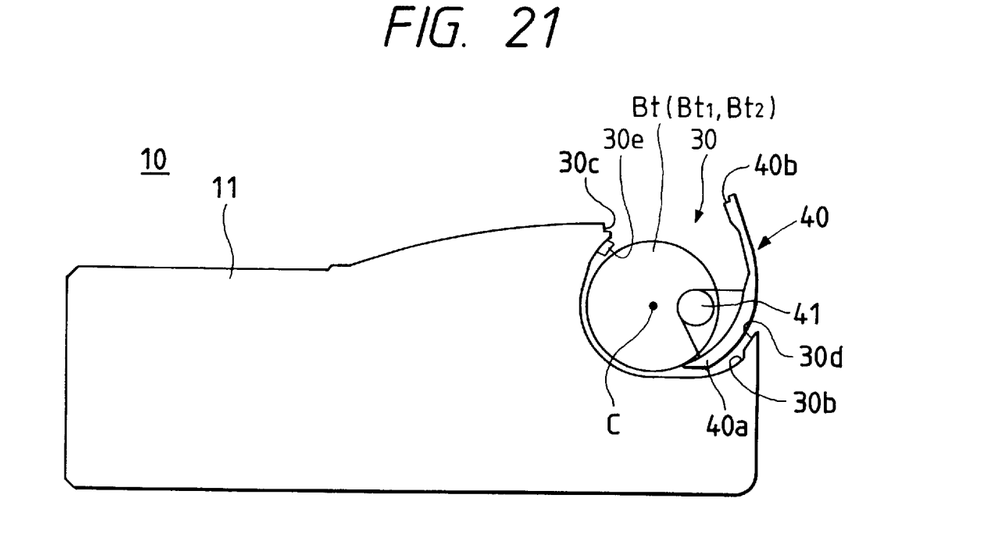
FIG. 21 is a diagram showing the battery accommodating chamber structure according to the fourth embodiment, with the battery lid half opened.
Figure 22:
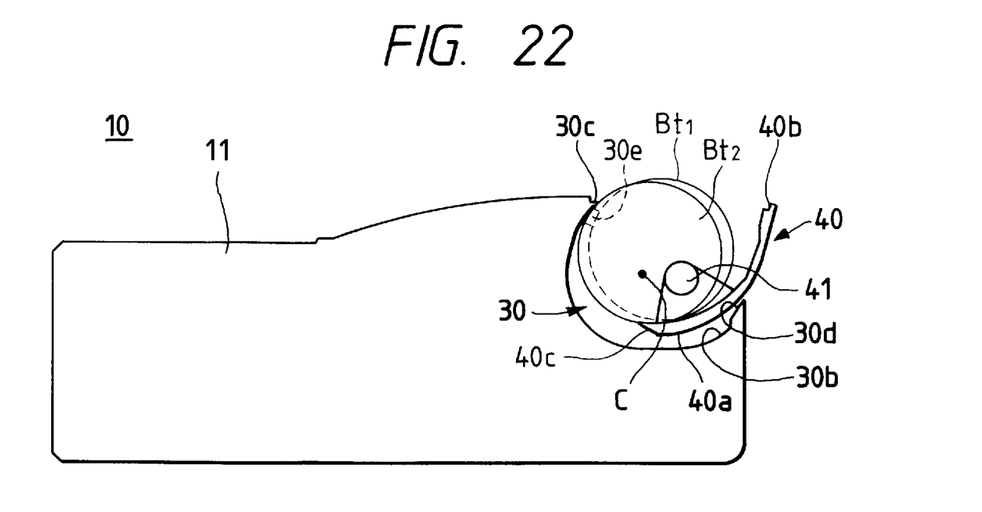
FIG. 22 is a diagram showing the battery accommodating chamber structure according to the fourth embodiment, with the battery lid opened fully.

FIG. 20 shows the battery accommodating chamber structure with two batteries Bt ($Bt_1$ and $Bt_2$) loaded in the battery chamber 30, and the battery lid 40 closed. When the battery lid 40 is turned about the shaft portions 41 to open, first the side portion 40a of the battery lid 40 enters into the battery chamber 30 (FIG. 21), and then the side portion 40a interposes between the batteries Bt and the inner wall 30b of the battery chamber 30 to slightly raise the batteries Bt from the battery chamber 30. Thereafter, the protrusion 30e is abutted against the outer cylindrical surface of the battery $Bt_1$. As a battery lid 40 is further opened, the first end portion of the battery $Bt_1$ (which is near the other battery $Bt_2$) abuts the protrusion 30e. As a result, the protrusion 30e influences the first end portion of the battery $Bt_1$ to move towards the battery lid 40 (to the right in FIG. 22) more than the end portion of the batter $Bt_2$ which is proximate to the first end portion of the battery $Bt_1$. Hence, a net force acting on the junction of the batteries $Bt_1$ and $Bt_2$ is shifted obliquely with respect to the central axis of the batteries $Bt_1$ and $Bt_2$. As a result, the elastic force of the negative-terminal-side contact piece 32 causes the two end portions of the batteries $Bt_1$ and $Bt_2$ which are abutted against each other to be ejected from the battery chamber 30. Hence, with the battery accommodating chamber structure of the camera 10 according to the fourth embodiment, the batteries Bt ($Bt_1$ and $Bt_2$) can be more readily removed from the battery chamber 30.

In the third and fourth embodiments, the protrusion 40d or 30e confronts the part of the outer cylindrical surface of the battery $Bt_1$ which is close to the junction of the two batteries $Bt_1$ and $Bt_2$; however, the invention is not limited thereto or thereby. That is, the same effect may be obtained by modifying the battery accommodating chamber structure such that the protrusion 40d or 30e confronts the part of the outer cylindrical surface of the battery $Bt_2$ which is close to the junction of the two batteries $Bt_1$ and $Bt_2$. Furthermore, in the second embodiment, the protrusion 40d or 30e may be formed on the battery lid 40 of the battery accommodating chamber structure of the camera 10. In this case, even the second embodiment may have the same effect as the third or fourth embodiment. In addition, the protrusion 40d or 30e may confront a portion of the outer cylindrical surface of the battery $Bt_1$ or $Bt_2$ near the positive-terminal-side contact piece 31 or negative-terminal-side contact piece 32.

In the above-described embodiments, the bearing holes 35 supporting the shaft portions 41 are formed such that they are located near the axis C of the battery chamber 30 and define an axis which is parallel with the axis C; however, the invention is not limited thereto or thereby. For example, the bearing holes 35 may be aligned on (coaxial with) the axis C of the battery chamber 30. The battery chamber structure of the present invention, even in this case, provides advantages in that the battery lid is not protruded entirely from the casing to avoid the accidental damage to or by the protruded lid, and that the batteries are slightly raised from the battery chamber to make it easy to take the batteries out of the battery chamber. Further, the bearing holes 35 may be so formed that they are coaxial with the central axis of the batteries Bt. In this case, also, the battery chamber structure of the present invention is free from the difficulty that the battery lid is entirely protruded from the casing. Furthermore, the battery chamber structure of the present invention, in which the bearing holes are coaxially arranged with respect to the central axis of the batteries, may be so modified that the battery lid is elastically deformed radially inwardly by contact with the inner wall of the battery chamber to push and raise the accommodated batteries from the battery chamber when the battery lid is opened.

In the above-described embodiments, the camera 10 is a digital still camera for recording image data on IC cards; however, the invention is not limited thereto or thereby. That is, instead of the IC card, a floppy disk or other data recording media may be employed as an image data recording medium.

Furthermore, in the above-described embodiments, the battery accommodating chamber structure according to the invention is formed in the camera 10; however, the invention is not limited thereto or thereby. That is, it may be applied to other digital still cameras, and other battery-operated electrical or electronic devices (such as silver-salt film cameras, portable radio sets, portable telephone sets, and electric shavers).

Moreover, in the above-described embodiment, two cylindrical batteries are loaded in the battery chamber; however, the invention is not limited thereto or thereby. That is, the technical concept of the invention is equally applicable to battery accommodating chamber structures that accommodate only a single battery or more than two batteries. Further, the batteries may be other than CR2 batteries.

What is claimed is:

1. A battery accommodating chamber structure comprising:

a battery housing with a substantially semi-cylindrical shape along a longitudinal axis, and a battery inserting opening through which a cylindrical battery is insertable into said battery housing and retainable therein in a battery accommodating position; and a battery lid mounted to said battery housing for rotation about a pivot axis extending parallel to said longitudinal axis for opening and closing said battery housing; wherein, upon rotating said battery lid about said pivot axis to open said battery housing, at least a part of said battery lid enters into said battery housing and forces an inserted cylindrical battery from said battery accommodating position.

2. A battery accommodating chamber structure as claimed in claim 1, wherein said pivot axis is spaced apart from said longitudinal axis a distance which is less than a radius of said cylindrical battery.

3. A battery accommodating chamber structure as claimed in claim 1, wherein said pivot axis is defined by a pair of shaft portions that extend longitudinally from said battery lid and insert into bearing holes provided in opposed end walls of said battery housing for rotatably supporting said battery lid.

4. A battery accommodating chamber structure as claimed in claim 1, wherein said battery lid is substantially arcuate in cross-section, and wherein said part of said battery lid is a longitudinal leading edge portion of said battery lid.

5. A battery accommodating chamber structure as claimed in claim 1, wherein, upon rotating said battery lid about said pivot axis to open said battery housing, said part of said battery lid interposes between said inserted cylindrical battery and an inner wall of said battery housing.

6. A battery accommodating chamber structure as claimed in claim 4, wherein said battery housing is shaped to accommodate at least two cylindrical batteries arranged in series, and wherein a battery ejecting protrusion is formed on said longitudinal leading edge portion of said battery lid which confronts an outer cylindrical surface of one of said at least two cylindrical batteries when said battery lid is rotated about said pivot axis to open said battery housing.

7. A battery accommodating chamber structure as claimed in claim 6, wherein said battery ejecting protrusion confronts said outer cylindrical surface of said one cylindrical battery at a location proximate to a junction between said at least two cylindrical batteries.

8. A battery accommodating chamber structure as claimed in claim 5, wherein said battery housing is shaped to accommodate at least two cylindrical batteries arranged in series, and wherein a protrusion inwardly projects from said inner wall of said battery housing at a location adjacent said battery inserting opening to confront an outer cylindrical surface of one of said at least two cylindrical batteries.

9. A battery accommodating chamber structure as claimed in claim 8, wherein said location is proximate to a junction between said at least two cylindrical batteries.

10. A battery accommodating chamber structure as claimed in claim 1, further comprising;

engaging steps formed on longitudinal edges of said battery inserting opening, said longitudinal edges being parallel to said longitudinal axis of said battery housing; and mating engaging steps formed on longitudinal edges of said battery lid;

wherein said mating engaging steps of said battery lid are respectively engageable with said engaging steps of said battery inserting opening when said battery housing is closed.

11. A battery accommodating chamber structure as claimed in claim 1, wherein said battery lid is substantially arcuate in cross-section, and forms a part of an outer wall of a casing of a battery-operated device.

12. A battery accommodating chamber comprising:

a battery housing for accommodating a battery in a battery accommodating position; and a battery lid mounted for rotation to said battery housing about a pivot axis for opening and closing said battery housing;

wherein, upon rotating said battery lid about said pivot axis to open said battery housing, said battery lid forces an accommodated battery from said battery accommodating position.

13. A battery accommodating chamber structure according to claim 1, wherein said longitudinal axis is substantially coincident with said pivot axis.

14. A battery accommodating chamber structure according to claim 1, wherein a longitudinal center axis of said cylindrical battery is substantially coincident with said pivot axis when said cylindrical battery is in said battery accommodating position; and wherein, upon being rotated about said pivot axis, said part of said battery lid is deflected radially inwardly by said battery housing and interposes between said battery housing and said inserted cylindrical battery.

15. A battery accommodating chamber structure according to claim 1, wherein said pivot axis is spaced from a longitudinal center axis of said inserted cylindrical battery.

16. A battery accommodating chamber structure according to claim 12, wherein said pivot axis is spaced from a longitudinal center axis of said inserted cylindrical battery.

* * * * *